(12) United States Patent
Chen (10) Patent No.: US 11,641,588 B2
(45) Date of Patent: May 2, 2023

(54) LISTENING METHOD AND DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/992,608

(22) Filed: Aug. 13, 2020

(65) Prior Publication Data

US 2020/0374709 A1 Nov. 26, 2020

Related U.S. Application Data

(63) Continuation of application No. PCT/CN2018/076898, filed on Feb. 14, 2018.

(51) Int. Cl.
*H04W 16/28* (2009.01)
*H04W 8/24* (2009.01)
*H04W 16/14* (2009.01)
*H04W 74/08* (2009.01)

(52) U.S. Cl.
CPC ............ *H04W 16/28* (2013.01); *H04W 8/24* (2013.01); *H04W 16/14* (2013.01); *H04W 74/0808* (2013.01)

(58) Field of Classification Search
CPC ....... H04W 8/24; H04W 16/14; H04W 16/28; H04W 74/0808
USPC .................................................. 370/328–329
See application file for complete search history.

(56) References Cited

U.S. PATENT DOCUMENTS

| | | | |
|---|---|---|---|
| 2010/0172296 A1* | 7/2010 | Singh | H04W 84/18 370/328 |
| 2016/0037560 A1* | 2/2016 | Liu | H04B 7/088 370/329 |
| 2016/0109573 A1* | 4/2016 | Kim | G01S 7/539 367/103 |
| 2017/0171758 A1* | 6/2017 | Li | H04L 25/0226 |
| 2017/0171887 A1 | 6/2017 | Shi et al. | |
| 2017/0254357 A1 | 9/2017 | Takahashi et al. | |

(Continued)

FOREIGN PATENT DOCUMENTS

| | | |
|---|---|---|
| CN | 108658751 A | 5/2017 |
| CN | 107196683 A | 9/2017 |

(Continued)

OTHER PUBLICATIONS

International Search Report in the international application No. PCT/CN2018/076898, dated Nov. 5, 2018.

(Continued)

*Primary Examiner* — Congvan Tran
(74) *Attorney, Agent, or Firm* — Ladas & Parry LLP (57) ABSTRACT

A listening method and device are provided. In the method: a sending node, on the basis of a beam direction used by the sending node for sending data to a receiving node, determines at least one listening direction to be listened to; the sending node implements carrier listening in the at least one listening direction; and, on the basis of the listening results in the at least one listening direction, the sending node uses the beam direction to send data to the receiving node.

17 Claims, 3 Drawing Sheets

(56) References Cited

U.S. PATENT DOCUMENTS

| | | | |
|---|---|---|---|
| 2018/0031694 A1* | 2/2018 | Kuo | G05D 1/0094 |
| 2018/0097771 A1 | 4/2018 | Liu et al. | |
| 2018/0115305 A1* | 4/2018 | Islam | H03J 7/186 |
| 2018/0115996 A1* | 4/2018 | Si | H04W 74/0808 |
| 2018/0191422 A1* | 7/2018 | Xia | H04B 7/0834 |
| 2018/0235008 A1 | 8/2018 | Park et al. | |
| 2019/0253116 A1* | 8/2019 | Priyanto | H04W 74/0833 |
| 2020/0092911 A1 | 3/2020 | Li et al. | |
| 2020/0314906 A1 | 10/2020 | Goyal et al. | |
| 2020/0329481 A1* | 10/2020 | Yi | H04W 72/02 |

FOREIGN PATENT DOCUMENTS

| | | |
|---|---|---|
| CN | 108668366 A | 10/2018 |
| EP | 3162158 A1 | 5/2017 |
| EP | 3637935 A1 | 4/2020 |
| WO | 2017020293 A1 | 2/2017 |
| WO | 2017026813 A1 | 2/2017 |
| WO | 2019079500 A1 | 4/2019 |

OTHER PUBLICATIONS

Supplementary European Search Report in the European application No. 18906206.0, dated Dec. 4, 2020.
Written Opinion of the International Search Authority in the international application No. PCT/CN2018/076898, dated Nov. 5, 2018.
First Office Action of the European application No. 18906206.0, dated Oct. 17, 2022.

* cited by examiner

LISTENING METHOD AND DEVICE

CROSS-REFERENCE TO RELATED APPLICATION

This is a continuation application of International Patent Application No. PCT/CN2018/076898, filed on Feb. 14, 2018, the contents of which are hereby incorporated by reference in its entirety.

BACKGROUND

In a 5th-Generation (5G) system, data transmission in an unlicensed frequency band is supported. Data transmission using the unlicensed frequency band is based on a Listen Before Talk (LBT) mechanism. That is, before sending data, a sending node needs to first sense whether a channel is idle, and sends data after determining that the channel is idle. How to effectively perform carrier sensing by a sending node to improve the signal transmission performance between the sending node and a receiving node in an unlicensed frequency band is a problem urgent to be solved.

SUMMARY

The embodiments of the disclosure provide a sensing method and device. A sending node can effectively perform carrier sensing to improve the signal transmission performance between the sending node and a receiving node in an unlicensed frequency band.

The disclosure relate to the field of communication.

In a first aspect, a sensing method is provided, which may include that: a sending node determines, according to a beam direction used by the sending node for sending data to a receiving node, at least one sensing direction to be sensed; the sending node performs carrier sensing on the at least one sensing direction; and the sending node sends, based on a sensing result in the at least one sensing direction, data to the receiving node by using the beam direction.

Accordingly, the sending node determines, based on a sending beam direction for sending data to the receiving node, at least one sensing direction to be sensed, and performs directional sensing in the at least one sensing direction, thereby sending data to the sending node based on a sensing result in the at least one sensing direction. Therefore, interference of data transmission between the sending node and other nodes is avoided, and the signal transmission performance between different nodes in an unlicensed frequency band is improved.

In a possible implementation, the at least one sensing direction may include a first sensing direction and/or a second sensing direction, and the first sensing direction may be a direction in which the sending node sends data to the receiving node.

In a possible implementation, the second sensing direction may be opposite to the first sensing direction.

In a possible implementation, the operation that the sending node performs carrier sensing on the at least one sensing direction may include that: the sending node performs carrier sensing on the at least one sensing direction until it is determined through sensing that the channel in the at least one sensing direction is idle.

In a possible implementation, the at least one sensing direction may include the first sensing direction and the second sensing direction. The operation that the sending node performs carrier sensing on the at least one sensing direction until it is determined through sensing that the channel in the at least one sensing direction is idle may include that: the sending node performs carrier sensing on the first sensing direction, and performs, after it is determined through sensing that a channel in the first sensing direction is idle, carrier sensing on the second sensing direction until it is determined through sensing that a channel in the second sensing direction is also idle; or, the sending node performs carrier sensing on the second sensing direction, and performs, after it is determined through sensing that a channel in the second sensing direction is idle, carrier sensing on the first sensing direction until it is determined through sensing that a channel in the first sensing direction is also idle.

In a possible implementation, the operation that the sending node performs carrier sensing on the at least one sensing direction may include that: the sending node performs, in at least one sensing window, carrier sensing on the at least one sensing direction, respectively.

A sensing window used by the sending node for performing carrier sensing on the first sensing direction may be a first sensing window, a sensing window used by the sending node for performing carrier sensing on the second sensing direction may be a second sensing window, the first sensing window may precede the second sensing window, or the first sensing window may follow the second sensing window, or the first sensing window may overlap the second sensing window.

In a possible implementation, before the sending node performs carrier sensing on the at least one sensing direction, the method may further include that: the sending node receives configuration information sent by the receiving node, the configuration information being used to indicate sensing information used for carrier sensing: or, the sending node acquires the sensing information pre-stored in the sending node.

The sensing information may include at least one of the following information: the at least one sensing direction, a sensing sequence of different sensing directions, or information of sensing windows corresponding to different sensing directions.

In a possible implementation, the information of the sensing window may include a time domain length of the sensing window and/or a time starting position of the sensing window.

In a possible implementation, before the sending node receives configuration information sent by the receiving node, the method may further include that: the sending node sends information about a sensing capability of the sending node to the receiving node, the sensing capability representing a capability of the sending node in supporting a sensing direction and/or a sensing sequence.

In a possible implementation, the operation that the sending node performs carrier sensing on the at least one sensing direction may include that: the sending node simultaneously performs carrier sensing on multiple sensing directions including the at least one sensing direction.

In a second aspect, a sensing method is provided, which may include that: a receiving node sends configuration information to a sending node, the configuration information being used to indicate sensing information used by the sending node for carrier sensing, the sensing information including at least one of the following information: at least one sensing direction to be sensed, a sensing sequence of the at least one sensing direction, or information of a sensing window used for carrier sensing on the at least one sensing direction, and the at least one sensing direction being determined by the sending node according to a beam used by the sending node for sending data to the receiving node.

Accordingly, the receiving node configures different sensing directions for the sending node, such that the sending node performs directional sensing on a beam in at least one sensing direction, thereby sending data to the sending node based on a sensing result in the at least one sensing direction. Therefore, interference of data transmission between the sending node and other nodes is avoided, and the signal transmission performance between different nodes in an unlicensed frequency band is improved.

In a possible implementation, the at least one sensing direction may include a first sensing direction and/or a second sensing direction, and the first sensing direction may be a direction in which the sending node sends data to the receiving node.

In a possible implementation, the second sensing direction may be opposite to the first sensing direction.

In a possible implementation, before the receiving node sends configuration information to the sending node, the method may further include that: the receiving node receives information about a sensing capability of the sending node sent by the sending node, the sensing capability representing a capability of the sending node in supporting a sensing direction and/or a sensing sequence.

In a third aspect, a sending node device is provided, which may execute the operations of the sending node in the first aspect or any optional implementation of the first aspect. Specifically, a terminal device may include modular units configured to execute the operations of the sending node in the first aspect or any optional implementation of the first aspect.

In a fourth aspect, a receiving node device is provided, which may execute the operations of the receiving node in the first aspect or any optional implementation of the first aspect. Specifically, a network device may include modular units configured to execute the operations of the receiving node in the second aspect or any optional implementation of the second aspect.

In a fifth aspect, a sending node device is provided, which includes a processor, a transceiver and a memory. The processor, the transceiver and the memory communicate with one another through an internal connecting path. The memory is configured to store instructions, and the processor is configured to execute the instructions stored in the memory. When the processor executes the instructions stored in the memory, such execution enables the sending node device to execute the method in the first aspect or any possible implementation of the first aspect, or such execution enables the sending node device to implement the sending node device provided in the second aspect.

In a sixth aspect, a receiving node device is provided, which includes a processor, a transceiver and a memory. The processor, the transceiver and the memory communicate with one another through an internal connecting path. The memory is configured to store instructions, and the processor is configured to execute the instructions stored in the memory. When the processor executes the instructions stored in the memory, such execution enables the receiving node device to execute the method in the second aspect or any possible implementation of the second aspect, or such execution enables the receiving node device to implement the receiving node device provided in the fourth aspect.

In a seventh aspect, a system chip is provided, which includes an input interface, an output interface, a processor and a memory. The processor is configured to execute an instruction stored in the memory. When the instructions is executed, the processor may implement the method in the first aspect or any possible implementation of the first aspect.

In an eighth aspect, a system chip is provided, which includes an input interface, an output interface, a processor and a memory. The processor is configured to execute an instructions stored in the memory. When the instruction is executed, the processor may implement the method in the second aspect or any possible implementation of the second aspect.

In a ninth aspect, a computer program product including an instruction is provided, which runs in a computer to enable the computer to execute the method in the first aspect or any possible implementation of the first aspect.

In a tenth aspect, a computer program product including an instruction is provided, which runs in a computer to enable the computer to execute the method in the second aspect or any possible implementation of the second aspect.

DETAILED DESCRIPTION

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
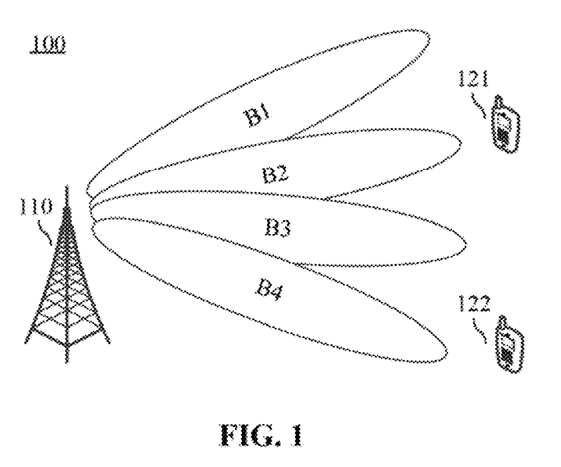
FIG. 1 is a schematic diagram of a wireless communication system to which the embodiments of the disclosure are applied.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. Optionally, the network device 110 may be a Base Transceiver Station (BTS) in the GSM system or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle device, a wearable device, a network-side device in a future 5G network, a network device in a future evolved Public Land Mobile Network (PLMN) or the like.

The wireless communication system 100 further includes at least one terminal device such as a terminal device 121 and a terminal device 122 within the coverage of the network device 110. The terminal device 121 and the terminal device 122 may be mobile or fixed. Optionally, the terminal device 121 and the terminal device 122 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like. Optionally, the terminal device 121 and the terminal device 122 may perform Device to Device (D2D) communication.

A network device and two terminal devices are exemplarily illustrated in FIG. 1. Optionally, the wireless communication system 100 may include multiple network devices and another number of terminal devices may be included in coverage of each network device. There are no limits made thereto in the embodiments of the disclosure.

Optionally, the wireless communication system 100 may further include another network entity such as a network controller and a mobility management entity. There are no limits made thereto in the embodiments of the disclosure.

In a 5G system, a frequency band used for data transmission is higher than a frequency band used in LTE, so the path loss of wireless signal transmission increases and the coverage of a wireless signal decreases. To this end, a beamforming technology is proposed in the 5G system to increase the gain of the wireless signal, thereby making up for the path loss. Specifically, a beam used by a base station to send a signal to a terminal device has directivity. Different beams actually correspond to different transmission directions. Each narrow beam can only cover part area of a cell, but not cover all areas of the cell. For example, as illustrated in FIG. 1, FIG. 1 illustrates four beams in different directions, that is, beam B1, beam B2, beam B3 and beam B4. The base station may transmit signals to the terminal device through the four beams in different directions. Beam B1 and beam B2 can cover the terminal device 121 instead of the terminal device 122. Beam B3 and beam B4 can cover the terminal device 122 instead of the terminal device 121. The base station may send a signal to the terminal device 121 through beam B1 and beam B2, and send a signal to the terminal device 122 through beam B3 and beam B4.

The following briefly introduces an LBT mechanism in unlicensed frequency bands involved in the embodiments of the disclosure, and a Request-To-Send (RTS)/Clear-To-Send (CTS) mechanism working in a Wireless Fidelity (WiFi) system in the unlicensed frequency bands.

In the 5G system, data transmission in the unlicensed frequency bands is supported. Data transmission using the unlicensed frequency bands is based on the LBT mechanism. That is, before sending data, a sending node needs to sense whether a channel is idle, and may only send data after determining that the channel is idle.

A link with an optimal measurement result may be acquired by indicating the sending and measuring processes of reference signals such as Channel State Indication Reference Signals (CSI-RSs), Sounding Reference Signal Reference Signals (SRSs) and Synchronizing Signal Blocks (SSBs) for data transmission between the terminal device and the network device. For example, both the network device and the terminal device have multi-beam direction sending and receiving capabilities. For an uplink direction, the terminal device uses beam B1 to send uplink data to the network device. When the network device uses beam B3 to receive the data, the optimal transmission performance can be obtained. That is, the measurement result on this link is optimal. Beam B3 of the network device and beam B1 of the terminal device form an optimal beam pair.

In order to ensure that the sending node can more effectively perform carrier sensing (also called beam sensing, channel sensing, sensing, etc.) before sending data to reduce interference in various directions, the embodiments of the disclosure propose that the sending node performs directional sensing on a beam in at least one sensing direction, and data is sent to the sending node based on a sensing result in the at least one sensing direction. Therefore, interference of data transmission between the sending node and other nodes can be avoided, and the signal transmission performance between different nodes in an unlicensed frequency band can be improved.

Figure 2:
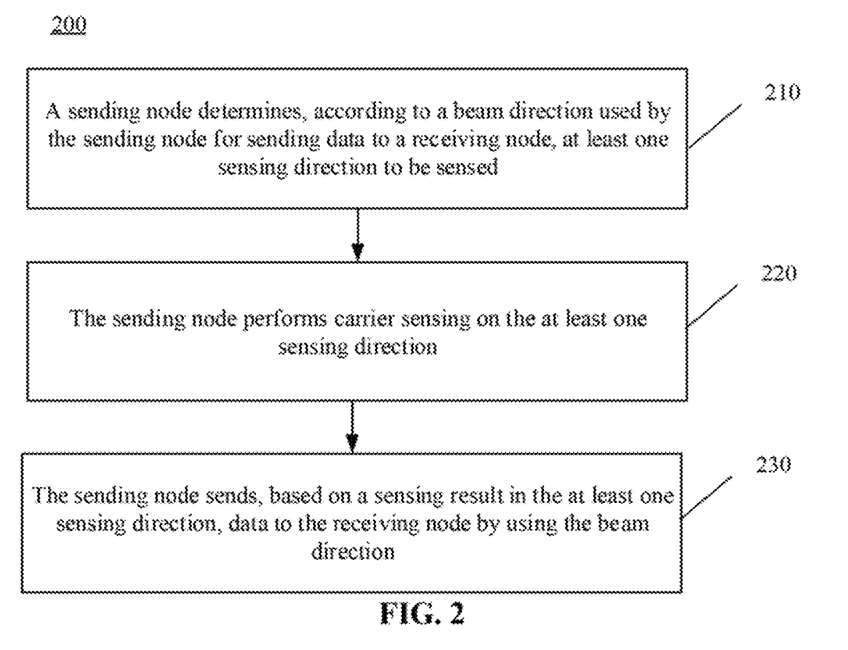
FIG. 2 is a schematic flowchart of a sensing method according to an embodiment of the disclosure.

FIG. 2 is a schematic flowchart of a sensing method according to an embodiment of the disclosure. A sending node illustrated in FIG. 2 may be, for example, the network device 110, the terminal device 121 or the terminal device 122 illustrated in FIG. 1. The method illustrated in FIG. 2 may be, for example, applied to unlicensed frequency bands. As illustrated in FIG. 2, the sensing method may include some or all of the following content:

In 210, the sending node determines, according to a beam direction used by the sending node for sending data to a receiving node, at least one sensing direction to be sensed.

Optionally, the at least one sensing direction includes the first sensing direction and/or the second sensing direction.

Optionally, the first sensing direction is a direction in which the sending node sends data to the receiving node. For example, the first sensing direction is consistent with the beam direction used by the sending node for sending data to the receiving node.

Optionally, the second sensing direction is opposite to the first sensing direction.

Figure 3:
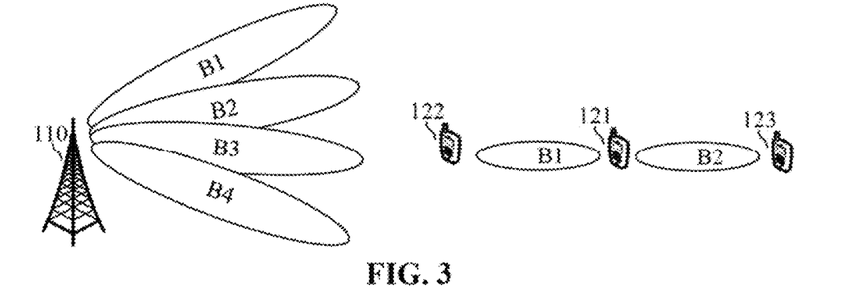
FIG. 3 is a schematic diagram of a sensing direction according to an embodiment of the disclosure.

For example, as illustrated in FIG. 3, the sending node is a terminal device 121. The terminal device 121 uses beam B1 to send data to the network device 110. The terminal device 121 determines at least one sensing direction to be sensed according to the direction of beam B1. The at least one sensing direction may include a first sensing direction and a second sensing direction opposite to the first sensing direction. The first sensing direction is the direction of beam B1 of the terminal device 121, and the second sensing direction is the direction of beam B2 of the terminal device.

In 220, the sending node performs carrier sensing on the at least one sensing direction.

Referring to FIG. 3, there may be other nodes near the terminal device 121 such as a terminal device 122 and a terminal device 123. The terminal device 122 is a node near the first sensing direction, and the terminal device 123 is a node near the second sensing direction. It is assumed that the terminal device 122 and the terminal device 123 use an omnidirectional antenna for data transmission. Before sending data to the network device 110, the terminal device 121 may perform carrier sensing in the first sensing direction, so that if the terminal device 122 has data being transmitted, the terminal device 121 may determine through sensing that a channel in the first sensing direction is occupied. The terminal device 121 may also perform carrier sensing in the second sensing direction, so that if the terminal device 123 has data being transmitted, the terminal device 123 may determine through sensing that a channel in the second sensing direction is occupied.

In this way, by sensing the first sensing direction through the terminal device, a hidden node in the first sensing direction, namely the terminal device 122, can be eliminated, thereby preventing the terminal device 121 from interfering with the data transmission of the terminal device 122. By sensing the second sensing direction through the terminal device, a hidden node in the second sensing direction, namely the terminal device 123, can be eliminated, thereby preventing the terminal device 123 from interfering with the data transmission of the terminal device 121. Accordingly, the signal transmission performance between different nodes in an unlicensed frequency band is improved.

In 230, the sending node sends, based on a sensing result in the at least one sensing direction, data to the receiving node by using the beam direction.

Accordingly, the sending node determines, based on a sending beam direction for sending data to the receiving node, at least one sensing direction to be sensed, and performs directional sensing in the at least one sensing direction, thereby sending data to the sending node based on a sensing result in the at least one sensing direction. Therefore, interference of data transmission between the sending node and other nodes is avoided, and the signal transmission performance between different nodes in an unlicensed frequency band is improved.

In 220, the sending node may perform carrier sensing on the at least one sensing direction based on two manners. The manners will be described below respectively.

Manner 1

Optionally, the operation that the sending node performs carrier sensing on the at least one sensing direction includes that: the sending node performs carrier sensing on the at least one sensing direction until it is determined through sensing that the channel in the at least one sensing direction is idle.

For example, the sending node performs carrier sensing on the first sensing direction, and sends data to the receiving node by using the beam direction until it is determined through sensing that a channel in the first sensing direction is idle.

For another example, the sending node performs carrier sensing on the second sensing direction, and sends data to the receiving node by using the beam direction until it is determined through sensing that a channel in the second sensing direction is idle.

For another example, the sending node performs carrier sensing on both the first sensing direction and the second sensing direction, and sends data to the receiving node by using the beam direction until it is determined through sensing that channels in both the first sensing direction and the second sensing direction are idle.

The sending node may perform carrier sensing on the first sensing direction, perform, after it is determined through sensing that the channel in the first sensing direction is idle, carrier sensing on the second sensing direction, and send data to the receiving node by using the beam direction until it is determined through sensing that the channel in the second sensing direction is also idle.

Or, the sending node may first perform carrier sensing on the second sensing direction, perform, after it is determined through sensing that the channel in the second sensing direction is idle, carrier sensing on the first sensing direction, and send data to the receiving node by using the beam direction until it is determined through sensing that the channel in the first sensing direction is also idle.

Manner 2

Optionally, the operation that the sending node performs carrier sensing on the at least one sensing direction includes that: the sending node performs, in at least one sensing window, carrier sensing on the at least one sensing direction of the target beam, respectively.

Optionally, a sensing window used by the sending node for performing carrier sensing on the first sensing direction is a first sensing window, and a sensing window used by the sending node for performing carrier sensing on the second sensing direction is a second sensing window.

Optionally, the first sensing window precedes the second sensing window, or the first sensing window follows the second sensing window, or the first sensing window overlaps the second sensing window.

The first sensing window and the second sensing window may be, for example, equal to 16 us or 25 us.

In manner 2, the sending node performs, in different sensing windows, carrier sensing on the first sensing direction and the second sensing direction. The sending node performs, in the first sensing window, carrier sensing on the first sensing direction, and performs, in the second sensing window, carrier sensing on the second sensing direction. If carrier sensing is performed on the first sensing direction and the second sensing direction sequentially, the first sensing window precedes the second sensing window in time. If carrier sensing is performed on the second sensing direction and the first sensing direction sequentially, the second sensing window precedes the first sensing window in time. If carrier sensing is performed on the first sensing direction and the second sensing direction simultaneously, the first sensing window overlaps the second sensing window in time.

However, in manner 1, a sensing window may not be provided, but data is sent to the receiving node by using the beam direction until it is determined through sensing that a channel in the at least one sensing direction is idle.

It is to be understood that, in the embodiments of the disclosure, a beam used to receive a signal can be understood as a spatial domain reception filter used to receive a signal, and a beam used to send a signal can be understood as a spatial domain transmission filter used to send a signal. Two signals sent using the same spatial domain transmission filter may be referred to be Quasi-Co-Located (QCL) with respect to spatial reception parameters.

Optionally, before 220, the sending node receives configuration information sent by the receiving node, the configuration information being used to indicate sensing information used for carrier sensing; or, the sending node acquires the sensing information pre-stored in the sending node.

The sensing information includes at least one of the following information: the at least one sensing direction, a sensing sequence of different sensing directions, and information of sensing windows corresponding to different sensing directions.

The information of the sensing window includes, for example, a time domain length of the sensing window and/or a time starting position of the sensing window.

That is to say, specific sensing directions to be sensed by the sending node, a sensing sequence of each of sensing directions or information about a sensing windows for sensing different sensing directions may be configured by the network device or predefined and pre-stored in the sending node, for example, as specified in a protocol.

Further, optionally, before the sending node receives configuration information sent by the receiving node, the method further includes that: the sending node sends information about a sensing capability of the sending node to the receiving node, the sensing capability representing a capability of the sending node in supporting a sensing direction and/or a sensing sequence.

The sending node reports information such as a supportable sending beam, a supportable sensing direction and a sensing sequence to the receiving node, and the receiving node selects a final sensing direction for sensing and the used sensing sequence, and configures the final sensing direction and the used sensing sequence to the sending node.

Optionally, the operation that the sending node performs carrier sensing on the at least one sensing direction includes that: the sending node performs carrier sensing on multiple sensing directions including the at least one sensing direction.

Optionally, the operation that the sending node performs carrier sensing on the at least one sensing direction includes that: the sending node performs carrier sensing on multiple sensing directions including the at least one sensing direction.

That is, the sending node may support omnidirectional sensing or quasi-omnidirectional sensing. For example, the sending node opens multiple panels at the same time to sense in all directions supported by the sending node, or the sending node opens part of panels to sense in some directions.

Figure 4:
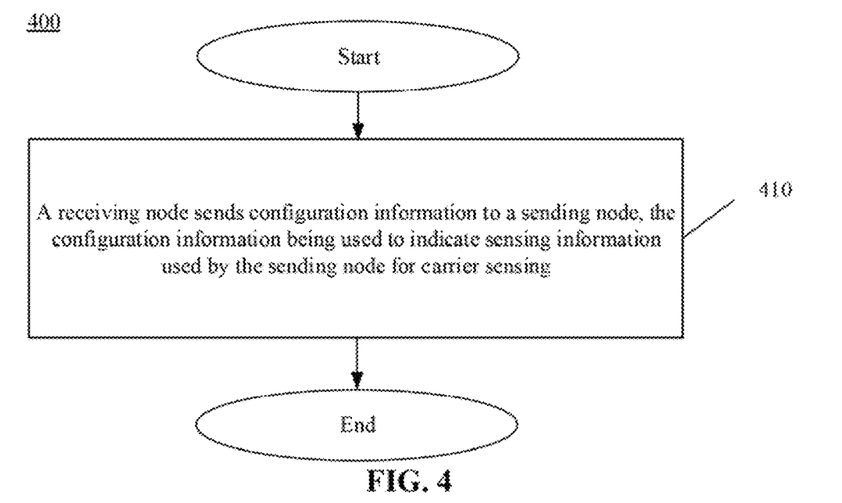
FIG. 4 is a schematic flowchart of a sensing method according to an embodiment of the disclosure.

FIG. 4 is a schematic flowchart of a sensing method according to an embodiment of the disclosure. A sending node illustrated in FIG. 4 may be, for example, the network device 110, the terminal device 121 or the terminal device 122 illustrated in FIG. 1. The method illustrated in FIG. 4 may be, for example, applied to unlicensed frequency bands. As illustrated in FIG. 4, the sensing method may include some or all of the following content:

In 410, a receiving node sends configuration information to the sending node, the configuration information being used to indicate sensing information used by the sending node for carrier sensing.

The sensing information includes at least one of the following information: at least one sensing direction, a sensing sequence of the at least one sensing direction, and information of a sensing window used for carrier sensing on the at least one sensing direction.

The at least one sensing direction is determined by the sending node according to a first sensing direction used by the sending node for sending data to the receiving node.

Accordingly, the receiving node configures different sensing directions for the sending node, such that the sending node performs directional sensing on a beam in at least one sensing direction, thereby sending data to the sending node based on a sensing result in the at least one sensing direction. Therefore, interference of data transmission between the sending node and other nodes is avoided, and the signal transmission performance between different nodes in an unlicensed frequency band is improved.

Optionally, the at least one sensing direction includes the first sensing direction and/or the second sensing direction.

Optionally, the first sensing direction is a direction in which the sending node sends data to the receiving node. For example, the first sensing direction is consistent with the beam direction used by the sending node for sending data to the receiving node.

Optionally, the second sensing direction is opposite to the first sensing direction.

Optionally, before the receiving node sends configuration information to the sending node, the method further includes that: the receiving node receives information about a sensing capability of the sending node sent by the sending node. The sensing capability represents a capability of the sending node in supporting a sensing direction and/or a sensing sequence.

It is to be understood that for a detailed description of the process performed by the receiving node in the process of carrier sensing by the sending node, reference may be made to the foregoing description of the sending node in FIG. 2 and FIG. 3.

It is also to be understood that, in each embodiment of the disclosure, a magnitude of a sequence number of each process does not mean an execution sequence and the execution sequence of each process should be determined by its function and an internal logic and should not form any limit to an implementation process of the embodiments of the disclosure.

The sensing method according to the embodiments of the disclosure is described above in detail and a device according to the embodiments of the disclosure will be described below in combination with FIG. 5 to FIG. 8. The technical characteristics described in the method embodiments are applied to the following device embodiments.

Figure 5:
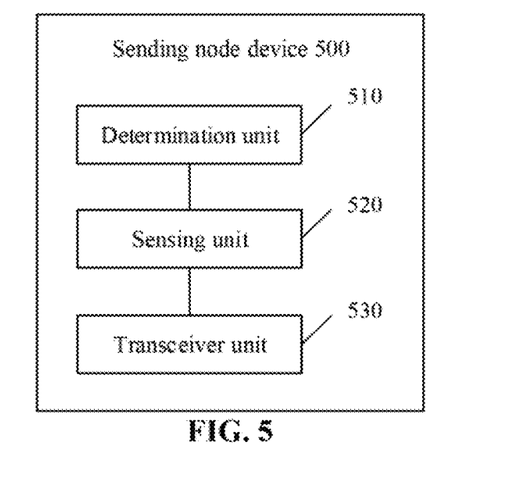
FIG. 5 is a schematic block diagram of a sending node device according to an embodiment of the disclosure.

FIG. 5 is a schematic block diagram of a sending node device 500 according to an embodiment of the disclosure. As illustrated in FIG. 5, the sending node device 500 includes a determination unit 510, a sensing unit 520 and a transceiver unit 530.

The determination unit 510 is configured to determine, according to a beam direction used by the sending node device for sending data to a receiving node device, at least one sensing direction to be sensed.

The sensing unit 520 is configured to perform carrier sensing on the at least one sensing direction.

The transceiver unit 510 is further configured to send, based on a sensing result in the at least one sensing direction, data to the receiving node device by using the beam direction.

Accordingly, the sending node determines, based on a sending beam direction for sending data to the receiving node, at least one sensing direction to be sensed, and performs directional sensing in the at least one sensing direction, thereby sending data to the sending node based on a sensing result in the at least one sensing direction. Therefore, interference of data transmission between the sending node and other nodes is avoided, and the signal transmission performance between different nodes in an unlicensed frequency band is improved.

Optionally, the at least one sensing direction includes a first sensing direction and/or a second sensing direction, and the first sensing direction is a direction in which the sending node device sends data to the receiving node device.

Optionally, the second sensing direction is opposite to the first sensing direction.

Optionally, the sensing unit 520 is specifically configured to: perform carrier sensing on the at least one sensing direction until it is determined through sensing that a channel in the at least one sensing direction is idle.

Optionally, the at least one sensing direction includes the first sensing direction and the second sensing direction. The sensing unit 520 is specifically configured to: perform carrier sensing on the first sensing direction, and perform, after it is determined through sensing that a channel in the first sensing direction is idle, carrier sensing on the second sensing direction until it is determined through sensing that a channel in the second sensing direction is also idle; or, perform carrier sensing on the second sensing direction, and perform, after it is determined through sensing that a channel in the second sensing direction is idle, carrier sensing on the first sensing direction until it is determined through sensing that a channel in the first sensing direction is also idle.

Optionally, the sensing unit 520 is specifically configured to: perform, in at least one sensing window, carrier sensing on the at least one sensing direction respectively. A sensing window used by the sending node device for performing carrier sensing on the first sensing direction is a first sensing window, a sensing window used by the sending node device for performing carrier sensing on the second sensing direction is a second sensing window, the first sensing window precedes the second sensing window, or the first sensing window follows the second sensing window, or the first sensing window overlaps the second sensing window.

Optionally, the sensing unit 520 is specifically configured to: receive, via the transceiver unit 510, configuration information sent by the receiving node device, the configuration information being used to indicate sensing information used for carrier sensing; or, acquire the sensing information pre-stored in the sending node, the sensing information including at least one of the following information: the at least one sensing direction, a sensing sequence of different sensing directions, or information of sensing windows corresponding to different sensing directions.

Optionally, the information of the sensing window includes a time domain length of the sensing window and/or a time starting position of the sensing window.

Optionally, the transceiver unit 510 is further configured to: send information about a sensing capability of the sending node device to the receiving node device, the sensing capability representing a capability of the sending node device in supporting a sensing direction or a sensing sequence.

Optionally, the sensing unit 520 is specifically configured to: simultaneously perform carrier sensing on multiple sensing directions including the at least one sensing direction.

It is to be understood that the sending node device 50 may execute the corresponding operations, executed by the sending node, in the method 200. For simplicity, no more elaborations will be made herein.

Figure 6:
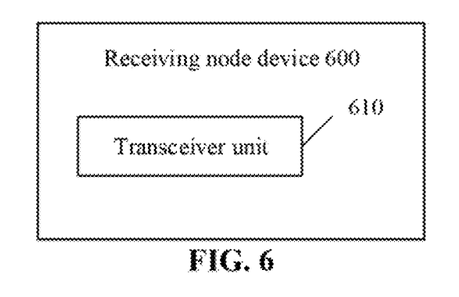
FIG. 6 is a schematic block diagram of a receiving node device according to an embodiment of the disclosure.

FIG. 6 is a schematic block diagram of a receiving node device 600 according to an embodiment of the disclosure. As illustrated in FIG. 6, the receiving node device 600 includes a transceiver unit 610, configured to send configuration information to a sending node device, the configuration information being used to indicate sensing information used by the sending node device for carrier sensing.

The sensing information includes at least one of the following information: at least one sensing direction to be sensed, a sensing sequence of the at least one sensing direction, or information of a sensing window used for carrier sensing on the at least one sensing direction, and the at least one sensing direction is determined by the sending node device according to a beam direction used by the sending node device for sending data to the receiving node device.

Accordingly, the receiving node configures different sensing directions for the sending node, such that the sending node performs directional sensing on a beam in at least one sensing direction, thereby sending data to the sending node based on a sensing result in the at least one sensing direction. Therefore, interference of data transmission between the sending node and other nodes is avoided, and the signal transmission performance between different nodes in an unlicensed frequency band is improved.

Optionally, the at least one sensing direction includes a first sensing direction and/or a second sensing direction, and the first sensing direction is a direction in which the sending node sends data to the receiving node.

Optionally, the second sensing direction is opposite to the first sensing direction.

Optionally, the transceiver unit 620 is further configured to: receive information about a sensing capability of the sending node device sent by the sending node device, the sensing capability representing a capability of the sending node device in supporting a sensing direction or a sensing sequence.

It is to be understood that the receiving node device 600 may execute the corresponding operations, executed by the receiving node, in the method 400. For similarity, no more elaborations will be made herein.

Figure 7:
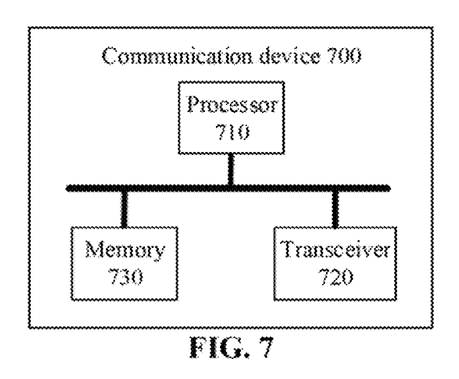
FIG. 7 is a schematic structure diagram of a communication device according to an embodiment of the disclosure.

FIG. 7 is a schematic structure diagram of a communication device 700 according to an embodiment of the disclosure. As illustrated in FIG. 7, the communication device includes a processor 710, a transceiver 720 and a memory 730. The processor 710, the transceiver 720 and the memory 730 communicate with one another through an internal connecting path. The memory 730 is configured to store an instruction, and the processor 710 is configured to execute the instruction stored in the memory 730 to control the transceiver 720 to receive a signal or send a signal.

Optionally, the processor 710 may call a program code stored in the memory 730 to execute corresponding operations, executed by the sending node, in the method 200. For simplicity, no more elaborations will be made herein.

Optionally, the processor 710 may call a program code stored in the memory 730 to execute corresponding operations, executed by the receiving node, in the method 400. For simplicity, no more elaborations will be made herein.

It is to be understood that the processor in the embodiment of the disclosure may be an integrated circuit chip and has a signal processing capability. In an implementation process, each step of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiment of the disclosure may be implemented or executed. The universal processor may be a microprocessor or the processor may also be any conventional processor and the like. The steps of the method disclosed in combination with the embodiment of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EE- PROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 8:
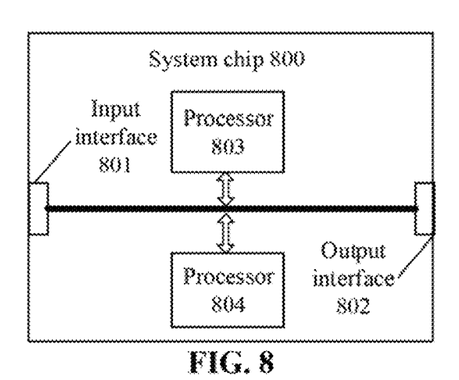
FIG. 8 is a schematic structure diagram of a system chip according to an embodiment of the disclosure.

FIG. 8 is a schematic structure diagram of a system chip according to an embodiment of the disclosure. The system chip 800 of FIG. 8 includes an input interface 801, an output interface 802, at least one processor 803 and a memory 804. The input interface 801, the output interface 802, the processor 803 and the memory 804 are connected with one another through an internal connecting path. The processor 803 is configured to execute a code in the memory 804.

Optionally, when the code is executed, the processor 803 may implement corresponding operations, executed by the sending node, in the method 200. For simplicity, no more elaborations will be made herein.

Optionally, when the code is executed, the processor 803 may implement corresponding operations, executed by the receiving node, in the method 400. For simplicity, no more elaborations will be made herein.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a sensing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The above-mentioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A sensing method, comprising:
sending, by a receiving node, configuration information to a sending node, the configuration information being used to indicate sensing information used by the sending node for carrier sensing,
wherein the sensing information comprises at least one of: at least one sensing direction, a sensing sequence of different sensing directions, or information of sensing windows corresponding to different sensing directions, and
the at least one sensing direction is determined by the sending node according to a beam used by the sending node for sending data to the receiving node;
wherein carrier sensing on the at least one sensing direction is performed until it is determined through sensing that a channel in the at least one sensing direction is idle.

2. The method according to claim 1, wherein the at least one sensing direction comprises a first sensing direction and/or a second sensing direction, the first sensing direction being a direction in which the sending node sends data to the receiving node.

3. The method according to claim 2, wherein the second sensing direction is opposite to the first sensing direction.

4. The method according to claim 1, before sending, by the receiving node, the configuration information to the sending node, further comprising:
receiving, by the receiving node, information about a sensing capability of the sending node sent by the sending node, the sensing capability representing a capability of the sending node in supporting a sensing direction or a sensing sequence.

5. A sending node device, comprising:
a processor, configured to: determine, according to a beam direction used by the sending node device for sending data to a receiving node device, at least one sensing direction to be sensed; and
perform carrier sensing on the at least one sensing direction determined by the processor; and
a transceiver, configured to send, based on a sensing result in the at least one sensing direction, data to the receiving node device by using the beam direction;
wherein the processor is specifically configured to:
receive, via the transceiver, configuration information from the receiving node device, the configuration information being used to indicate sensing information used for carrier sensing;
the sensing information comprising at least one of: the at least one sensing direction, a sensing sequence of different sensing directions, or information of sensing windows corresponding to different sensing directions;
wherein the processor is specifically configured to:
perform carrier sensing on the at least one sensing direction until it is determined through sensing that a channel in the at least one sensing direction is idle.

6. The sending node device according to claim 5, wherein the at least one sensing direction comprises a first sensing direction and/or a second sensing direction, the first sensing direction being a direction in which the sending node device sends data to the receiving node device.

7. The sending node device according to claim 6, wherein the second sensing direction is opposite to the first sensing direction.

8. The sending node device according to claim 5, wherein the at least one sensing direction comprises the first sensing direction and the second sensing direction,
the processor is specifically configured to:
perform carrier sensing on the first sensing direction, and perform, after it is determined through sensing that a channel in the first sensing direction is idle, carrier sensing on the second sensing direction until it is determined through sensing that a channel in the second sensing direction is also idle; or,
perform carrier sensing on the second sensing direction, and perform, after it is determined through sensing that a channel in the second sensing direction is idle, carrier sensing on the first sensing direction until it is determined through sensing that a channel in the first sensing direction is also idle.

9. The sending node device according to claim 5, wherein the processor is specifically configured to:
perform, in at least one sensing window, carrier sensing on the at least one sensing direction, respectively,
wherein a sensing window used by the sending node device for performing carrier sensing on the first sensing direction is a first sensing window, and a sensing window used by the sending node device for performing carrier sensing on the second sensing direction is a second sensing window; and
the first sensing window precedes the second sensing window, or the first sensing window follows the second sensing window, or the first sensing window overlaps the second sensing window.

10. The sending node device according to claim 5, wherein the information of the sensing windows comprises a time domain length of the sensing window and/or a time starting position of the sensing window.

11. The sending node device according to claim 5, wherein the transceiver is further configured to:
send information about a sensing capability of the sending node device to the receiving node device, the sensing capability representing a capability of the sending node device in supporting a sensing direction or a sensing sequence.

12. The sending node device according to claim 5, wherein the processor is specifically configured to:
simultaneously perform carrier sensing on a plurality of sensing directions comprising the at least one sensing direction.

13. The sending node device according to claim 5, wherein the transceiver is further configured to send, based on the sensing result in the at least one sensing direction, the data to the receiving node device in an unlicensed frequency band by using the beam direction.

14. A receiving node device, comprising:
a transceiver, configured to send configuration information to a sending node device, the configuration information being used to indicate sensing information used by the sending node device for carrier sensing,
the sensing information comprising at least one of: at least one sensing direction, a sensing sequence of different sensing directions, or information of sensing windows corresponding to different sensing directions,
wherein the at least one sensing direction is determined by the sending node device according to a beam direction used by the sending node device for sending data to the receiving node device;
wherein carrier sensing on the at least one sensing direction is performed until it is determined through sensing that a channel in the at least one sensing direction is idle.

15. The receiving node device according to claim 14, wherein the at least one sensing direction comprises a first sensing direction and/or a second sensing direction, the first sensing direction being a direction in which the sending node sends data to the receiving node.

16. The receiving node device according to claim 15, wherein the second sensing direction is opposite to the first sensing direction.

17. The receiving node device according to claim 14, wherein the transceiver is further configured to:
receive information about a sensing capability of the sending node device from the sending node device, the sensing capability representing a capability of the sending node device in supporting a sensing direction or a sensing sequence.

* * * * *